(12) United States Patent
Wagner et al.

(10) Patent No.: US 8,583,880 B2
(45) Date of Patent: Nov. 12, 2013

(54) METHOD FOR SECURE DATA READING AND DATA HANDLING SYSTEM

(75) Inventors: Mathias Wagner, Alvesen-Rosengarten (DE); Ralf Malzahn, Seevetal (DE)

(73) Assignee: NXP B.V., Eindhoven (NL)

( * ) Notice: Subject to any disclaimer, the term of this patent is extended or adjusted under 35 U.S.C. 154(b) by 422 days.

(21) Appl. No.: 12/992,845

(22) PCT Filed: Apr. 29, 2009

(86) PCT No.: PCT/IB2009/051743
§ 371 (c)(1),
(2), (4) Date: Nov. 15, 2010

(87) PCT Pub. No.: WO2009/138892
PCT Pub. Date: Nov. 19, 2009

(65) Prior Publication Data
US 2011/0072222 A1    Mar. 24, 2011

(30) Foreign Application Priority Data
May 15, 2008 (EP) .................................... 08103978

(51) Int. Cl.
*G06F 12/00* (2006.01)

(52) U.S. Cl.
USPC .... 711/155; 711/156; 711/167; 711/E12.011; 711/E12.092; 706/20; 706/25; 706/46; 714/38.1; 714/38.13; 714/25; 714/42; 714/48

(58) Field of Classification Search
USPC .................. 711/155, 167, E12.001, E12.092; 706/20, 25, 46; 714/38.1, 38.13, 25, 714/42, 48
See application file for complete search history.

(56) References Cited

U.S. PATENT DOCUMENTS

| | | | | |
|---|---|---|---|---|
| 7,584,386 | B2 * | 9/2009 | Bancel et al. | 714/45 |
| 8,375,253 | B2 * | 2/2013 | Benoit | 714/38.1 |
| 2003/0204696 | A1 * | 10/2003 | Yi | 711/167 |
| 2005/0219796 | A1 | 10/2005 | Narendra et al. | |
| 2006/0219796 | A1 | 10/2006 | Na | |

FOREIGN PATENT DOCUMENTS

| | | |
|---|---|---|
| EP | 1904946 A | 4/2008 |
| WO | 9935554 A2 | 7/1999 |
| WO | 2004047172 A1 | 6/2004 |
| WO | 2004049349 A2 | 6/2004 |
| WO | 2007020567 A1 | 2/2007 |

OTHER PUBLICATIONS

Bar-El, Hagai, et al; "The Sorcerer's Apprentice Guide to Fault Attacks"; Internet Citation URL:http://web.archive.org/web/20041016071838/eprint.iacr.org/2004/100 (retrieved May 27, 2005).

(Continued)

*Primary Examiner* — Tuan Thai
*Assistant Examiner* — Zhuo Li

(57) ABSTRACT

A method for secure data reading and a data handling system is provided. The method protects the data reading from fault attacks by repeating read request in an interleaved manner, in particular the method comprises the steps of (M200) dispatching a first read request; (M400) dispatching a second read request; (M600) dispatching a further first read request; and (M1000-a) producing an anomaly signal if a first result produced by the memory in response to the first read request does not agree with a further first result produced by the memory in response to the further first read request.

16 Claims, 12 Drawing Sheets

(56) References Cited

OTHER PUBLICATIONS

International Search Report for Application PCT/IB2009/051743 (Jul. 27, 2009).

Boneh, D. et al. "On the Importance of Checking Crytographic Protocols for Faults", Eurocrypt, 14 pgs, retrieved from the internet at: citeseerx.ist.psu.edu/viewdoc/download?doi=10.1.1.48.9764 (1997).

* cited by examiner

METHOD FOR SECURE DATA READING AND DATA HANDLING SYSTEM

FIELD OF THE INVENTION

The invention relates to a method for data reading for a data handling system comprising an address dispatcher, for dispatching read requests to a memory.

The invention also relates to a data handling system comprising an address dispatcher, for dispatching read requests to a memory.

The invention also relates to a computer program product comprising computer code.

BACKGROUND OF THE INVENTION

Fault attacks can be used, e.g., to compromise the security and integrity of data handling system, such as computer products. In particular, fault attacks are an area of concern for smart cards. A fault attack introduces a fault into the system during the system's operation, thereby causing the system to deviate from its programmed operation. In the past, fault attacks were commonly glitch attacks, such as induced on a power line, clock line or a reset line. More recently, light attacks have been found to be a relatively easy way of introducing a fault and disturbing the program flow of a microcontroller. A light attack is executed by flashing light on a surface of, e.g., an integrated circuit (IC), typically while the IC is operating.

Fault attacks are typically targeted on commands, such as conditional jumps or the test instructions preceding them. For example, fault attacks can be used to circumvent a verification of a PIN number in a smart card. If a user enters an incorrect PIN number, he/she can execute a fault attack at the moment the program is about to jump away to a routine for handling wrong PIN numbers. As a result of the fault attack the jump to the routine for handling wrong PIN numbers is not executed and the program continues as if the PIN number was correct. In this case the user gains, through the fault attack, the privileges associated with a correct PIN number, even though he/she only has possession of a wrong PIN number.

Other classes of security attacks that use fault attacks are those on cryptographic algorithms, such as used in, e.g., cryptographic protocols. For example, using the fault attack, an attacker can cause the algorithm to produce a wrong value. By analyzing the type of errors that occur in this manner, the attacker is, in some circumstances, able to deduce, e.g., a secret key. See, e.g., Boneh at al., "On the Importance of Checking Cryptographic Protocols for Faults", 1997, Lecture Notes in Computer Science, volume 1233, pages 37-51. The latter attack is also known as the Bellcore attack.

Light attacks affect a read access to a memory, such as volatile memory, such as RAM, and non-volatile memory, such as Read Only Memory (ROM), EEPROM and Flash-memory. The effect of a light attack can be varied depending on the exact type of memory and the exact conditions. For example, in non-volatile memories, usually, it is not the content of the memory cell, which is changed by the light attack, but only the value that is read back, which is momentarily changed; after the light attack is over, the memory may return to its previous content, which content is not changed by the light attack. Depending on the exact conditions, the effect can be asymmetric, in that the bits tend to flip from one value more readily into another value than from the other value into the one value. As a further example, in volatile memory, a light attack may, depending on the focal point of the light attack, effect either a permanent change in the memory or a momentary change during reading.

A fault attack introducing a single uninterrupted stretch of faults will be referred to as a simple fault attack. A fault attack compromising a single read from a memory will be referred to as a short fault attack. A simple fault attack compromising more than one reading operation, e.g., a long light flash covering more than one reading operation, will be referred to as a long fault attack. A fault attack comprising multiple independent faults will be referred to as a multiple fault attack.

Published US patent application 20030204696: "Tamper-resistant method and data processing system using the same" discloses a method for preventing tampering of a data processing system, and is incorporated herein by reference.

The method according to US patent application 20030204696, involves a first reading of a data item from a region of the memory and a second reading of the data item from the region of the memory, the second reading immediately after the first reading, and determining whether the first reading and the second reading produced identical results. In case the results are not identical a fault has been detected. In this manner simple fault attacks covering only one of the two reads can be detected.

The method according to US patent application 20030204696 fails to detect a fault if the fault extends to both the first reading and the second reading, as the comparison may then not detect any difference. In particular, not all long fault attacks will be detected.

It is a problem of the prior art that fault attacks covering more than one reading operation from a memory, are not reliably detected.

SUMMARY OF THE INVENTION

It is an object of the invention to improve the detection of fault attacks while reading from a memory.

The object is achieved by the method for data reading according to the invention. The method according to the invention is a method for secure data reading for a data handling system comprising an address dispatcher, for dispatching read requests to a memory. The method comprises: dispatching a first read request; dispatching a second read request; dispatching a further first read request; producing an anomaly signal if a first result produced by the memory in response to the first read request does not agree with a further first result produced by the memory in response to the further first read request, wherein: the first read request is dispatched before the second read request is dispatched, and the second read request is dispatched before the further first read request is dispatched.

For a fault attack, targeting the first read request or the further first read request, to be successful, it has to target both of them. A simple fault attack that targets both the first read request and the further first read request will also disturb the second read request. As a result the operation of a device employing the method will be further disturbed than the attacks tries to accomplish. As a result the operation of the device may fail and the attack may be thwarted.

In a preferred embodiment of the method according to the invention, the method for secure data reading comprises the steps of: dispatching a first read request; dispatching a second read request; dispatching a further first read request; producing an anomaly signal if a first result produced by the memory in response to the first read request does not agree with a further first result produced by the memory in response to the further first read request, producing the anomaly signal if a second result produced by the memory in response to the second read request does not agree with expectancy data associated with the second read request; wherein: the first read request is dispatched before the second read request is dispatched, and the second read request is dispatched before the further first read request is dispatched.

The method according to the invention detects both long and short fault attacks. A long or short fault attack covering the first read request, but not the further first read request is detected, since a first result produced by the memory in response to the first read request does, in that case, not agree with a further first result produced by the memory in response to the further first read request. A long fault attack covering the first read request, the second read request, and the further first read request will be detected, since the second read request will, because of the fault, produce a result that is different from the expectancy data associated with the second read request.

By interleaving repeated reads with other reads that produce an expected result, fault attacks can be detected that last longer than a single instruction.

The method for secure data reading can also be applied in situations where not so much the security as the robustness of the application is an issue. Examples include: safety-critical apparatuses, such as medical apparatuses; mission-critical apparatuses, e.g., apparatuses, the failing of which can have large damage or financial consequences; or apparatuses that are known the be used in extreme environments, e.g., with very high or low temperatures; or for apparatuses that operate at the edge of their capabilities, e.g., ICs operating at very high clock speeds; or for devices, suffering, during operational use, from particle showers that can create memory faults, such as occurring in outer space; or in areas with increased levels of radiation, such as used in some hospital equipment.

Examples of data reading are: reading instructions, such as, e.g., used in a computer program; reading data on which instructions are to operate; reading data for forwarding to other apparatuses; parameters; obtaining sensor readings from sensors; reading data created by devices, such as coprocessors, e.g., a cryptography coprocessor. The method is particularly advantageous for instructions, as the method prevents, e.g., the circumventing of conditional jumps. The method is particularly advantageous for data on which instructions are to operate, as they prevent attacks, such as the Bellcore attack.

An address dispatcher is an apparatus that sends or forwards read requests to a memory. Examples of an address dispatcher are: a central processing unit (CPU), such as an 8051 CPU, an ARM CPU, or a MIPS CPU; a memory management unit, for managing memory resources, possibly including virtual memory; a software implementation of a protocol, which accesses a memory over a digital network, such as the Server Message Block (SMB) protocol. The method is particularly advantageous for data stored in an integrated memory, as the fault attack can then be executed at the same place as the data is processed.

The memory can, for example, be made from ROM memory, or, e.g., any other kind of suitable storage, which is vulnerable to transient errors.

A read request typically comprises an address. The address can be a direct representation of a physical memory cell. The address may also be a virtual address. In some situations, for example, if the read request targets a sensor, the read request may be a request for a full copy of the memory. A read request may target any convenient amount of data. Typically the read request will be for a number of bytes equal to the memory width. A read request can also target, e.g., a byte, a word, a double word, and so on. The read request may be transformed along the way from the origin of the read request towards the memory. For example, if the read request is for a virtual address, the virtual address may at some point be transformed into a read request for a physical address. Such read request transformations are optional and can be done at any point before the read request is acted upon by the memory.

Typically the further first read request is an exact copy of the first read request, but this is not necessary. The further first read request can also target less data. For example, the first read request may request 4 bytes of memory, whereas the further first read request only targets, at the same addresses, 2 of the 4 bytes of memory. It may also be the other way around, e.g., the first read request may request 2 bytes of memory, whereas the further first read request targets 4 bytes of memory, including the 2 bytes of memory.

Reading in only part of the full memory width, during the first or further first read, will reduce the level of protection, as the attack may happen in the part not read twice. The protection will apply to the physical memory, which is read twice and of which the reading operations are suitably interleaved. An advantage of reducing the number of bytes read in any of the first of further first read request is that the power consumption used by the method is reduced.

In one embodiment, two results produced by the memory agree with each other if the results are equal. Using equality to verify agreement has the advantage that it is particularly simple to implement and gives a high level of assurance that the data is not tampered with.

In one embodiment, a different number of bytes are requested by the first read request and the further first read request, wherein at least one common byte is requested by both the first read request and the further first read request. The first read request and the further read request both request the common byte from the same address in a memory. In this embodiment the results agree if the common byte produced by the memory in response to the first read request is equal to the common byte produced by the memory in response to the further first read request.

In some embodiments, the memory stores a plurality of bits. And the memory is addressable through bitlines and wordlines. Each specific bit is stored at a combination of a specific bitline and a specific wordline. A light attack typically attacks all bits stored with respect to a particular bit line. In an embodiment that stores a specific data bit along with a parity bit, it is especially advantageous if the parity bit is stored at the specific bit line, but at a word line different from the specific word line.

An anomaly signal can comprise additional information, such as the type of anomaly that occurred, a time stamp, the region in memory where the fault occurred, etc. Typically, the anomaly signal is forwarded to an anomaly handler, which can take corrective action. Corrective action can include: repeating the read request that caused the anomaly signal, shutting down the data handling system, or clearing all memories.

Expectancy data associated with the second read request can come from a variety of sources, for example, by reading back a value written earlier.

Between the steps of the method other operations can be interposed. For example, another read request may be interposed between any two steps of the method. This may be advantageous, for example, in case a low-security task is executed in parallel to a high-security task. The low security task can interpose its read requests, which are not specifically protected against fault attacks in between the read request of the high-security task, which are protected against fault attacks according to the invention.

The method according to the invention is especially advantageous for use in a data handling system wherein the memory, and possible busses used in combination with the memory, have a high bandwidth, relative to the CPU speed. In that situation, repeating read requests according to the invention will not substantially slow down the CPU, as the bandwidth of the memory can deal with speeds higher than the speed of the CPU. In that case, the method according to the invention may be enabled for the entire time of code execution and/or data fetching. Typically this advantage will occur when reading from a ROM.

In a preferred embodiment of the method according to the invention, the method comprises an additional step, to be executed after the dispatching of the further first read request, and before the producing of the anomaly signal: dispatching a further second read request. The expectancy data associated with the second read request is the further second result produced by the memory in response to the further second read request.

By repeating the reading of data in an interleaved manner, an attacker using a simple fault attack is forced to disturb multiple values. The only way to disturb, in an undetected manner the reading of the data is by attacking all of: the first read request, the second read request, the further first read request and the further second read request. In this way, the fault needs to be extended to an ever longer length in order to go undetected. This is disadvantageous for the attacker for a number of reasons. As the fault becomes longer the program flow becomes more disturbed, and it becomes more likely that the attack will cause the device to assume undesirable states, such as crashes. This problem is more pronounced in situations were the memory is encrypted. A fault attack on an encrypted memory will, after decryption, produce random data. The longer a stream of random data, e.g., instructions, is, the less predictable the result of the attack becomes. A second disadvantage is that as the attacker is forced to attack longer sequences, he/she has fewer options in how to influence the system.

Also, the particularly attractive attack of removing a single instruction, such as a branching instruction, will not be possible then. Removing many instructions from the program flow further carries the risk for the attacker that some important instructions, such as decoding instructions, will not be performed, in which case the attack is rendered useless.

If both the expectancy data itself and the second read request are disturbed in the same manner by a multiple fault attack, the method may fail to notice the multiple fault attack.

Note that this method can be employed for any number of read requests. For example, given a number of read requests: first dispatch the number of read requests, and then dispatch the number of further read requests.

This method is advantageously employed for reading keys. For example, to read a key consisting of 16 key-bytes, can be done as follows: First dispatch 16 read requests of one byte, targeted at the 16 key-bytes, Second dispatch 16 further read requests also of one byte each, also targeted at the 16 key-bytes.

In a preferred embodiment of the method according to the invention, the method comprises an additional step, to be executed before the dispatching of the second read request: configuring the memory in a test mode, wherein the memory is arranged to produce a predetermined fixed response to the second read request; and/or an additional step to be executed after the dispatching of the second read request: reconfiguring the memory in a non-test mode; wherein the expectancy data associated with the second read request is equal to the predetermined fixed response to the second read request.

For the second read request a dummy read request can be used. A dummy read request is a read request in a read-known-answer mode. For example, a dummy read request can be implemented as a test read request made in a test mode, wherein a known answer is expected. The test read request can be effected by making the read request while the memory word line is disabled. The dummy read request is also disturbed by a light attack. This way one can detect whether the dummy read request has been hit by a light attack The predetermined fixed response to the second read request is independent of the stored contents in the memory region, indicated by the second read request.

A long fault attack will also cover, i.e. hit, the second read request. If the second read request is disturbed, the second result produced by the memory is changed. Accordingly, the verification with the known result, i.e. the expectancy data, will fail. A short fault attack is still detected, since a short fault attack hitting only the first request or the further read request will produce the anomaly signal.

Dummy read requests are especially advantageous at the start of a sequence of read requests according to the invention, when the sequence is under attack of a fault attack, such as a light attack. In case there are gaps in the sequence, these gaps can be filled with such dummy read requests. A dummy read request early in the sequence also overcomes a problem that occurs if the light is already switched on before the sequence commences. In the absence of a dummy read request, or its corresponding check, such an attack would remain undetected as long as the light stays on. In the latter situation, no sensible code would be executed, mitigating the gravity of this situation. However, this problem may become more serious if the method according to the invention, utilizing interleaved repeated read request, is not done during the entire duration a device, using the method, is operative, but is switched on and off depending on, e.g., the security and/or performance needs. A dummy read request towards the beginning of the read sequence solves this problem, as it is an absolute measurement of the light being on or off. Whereas, in contrast, the interleaved readings can be viewed as a kind of differential light detector that only detects the change of the light, i.e. the turning on or off of the light, but not the light as such.

In a preferred embodiment of the method according to the invention, the method comprises an additional step, to be executed after the dispatching of the further first read request and before the dispatching of the further second read request: dispatching a third read request. The method comprises a further additional step, to be executed after the dispatching of the further second read request: dispatching a further third read request and wherein the method comprises a still further additional step, to be executed after the dispatching of the further third read request: producing the anomaly signal if a third result produced by the memory in response to the third read request does not agree with a further third result produced by the memory in response to the further third read request.

By combining the read requests in this manner, any individual read request that is attacked will be detected. Moreover, any fault attack that lasts longer than one read request will also be detected.

At any point an, otherwise unrelated, read request can be inserted in between the steps of the method. Using this, the series of read requests can be expanded with any number of read requests, while at the same time having a minimum delay in the throughput. Extending the series is an advantage as more read requests are protected. Moreover, the extended series has the property that the time between any first and further dispatching of a read request can be maintained substantially constant, simplifying the producing of the anomaly signal.

This method is advantageously employed for reading keys. For example, to read a key consisting of 16 key-bytes, the 16 read requests for retrieving the 16 key-bytes are numbered from 1 to 16. Each read request is dispatched twice, in the order given below:

1, X, 2, 1, 3, 2, 4, 3, 5, 4, 6, 5, 7, 6, 8, 7, 9, 8, 10, 9, 11, 10, 12, 11, 13, 12, 14, 13, 15, 14, 16, 15, X, 16.

The places marked 'X' are especially suitable for inserting a dummy read request. The places marked 'X' could also be ignored.

In a preferred embodiment of the method according to the invention, the method comprises an additional step, to be executed after the dispatching of the further first read request, and before the dispatching of the third read request: dispatching a more further second read request. The anomaly signal is also produced if the second result produced by the memory in response to the second read request does not agree with a more further result produced by the memory in response to the more further second read request.

The second read request is protected against a multiple fault attack, wherein two separate short faults are used. As the second read request is read three times, only two can be targeted. As a result such an attack will be detected. To best advantage the pattern is extended as is explained in the detailed embodiments.

To detect multiple fault attacks that comprise more than 2 fault attacks, the read requests can be repeated more often correspondingly. For example, to detect 'N' fault attacks, the read requests could be repeated at least 'N+1' times.

In a preferred embodiment of the method according to the invention, the dispatching of read requests comprises receiving a first series of initial read request and dispatching a second series of read requests, the method being arranged to transform the first series into the second series. The second series comprises the dispatching of the first read request, the dispatching of the second read request and the dispatching of the further first read request. Substantially each received initial read request in the first series is dispatched at least twice in the second series. Between a first dispatching of substantially any specific read request and the further dispatching of the specific read request at least one other read request is dispatched. The other read request is different from the specific read request. The method comprises the step of producing the anomaly signal if a specific result produced by the memory in response to the first dispatching of the specific read request does not agree with a further specific result produced by the memory in response to the further dispatching of the specific read request.

In the second series the read requests are dispatched in an interleaved fashion. A simple fault attack extending over at most two dispatchings will therefore always be detected.

Better protection is achieved by protecting a longer series of dispatchings. As a first, unprotected series of read requests is received, a second series of dispatchings is constructed. Note that the series of receivings is interleaved with the series of dispatchings. After a number of requests have been received, the first dispatchings can be started.

In this way, the advantage is achieved that the protection against fault attacks is extended over more dispatchings.

In a preferred embodiment of the method according to the invention, between the first dispatching of substantially any specific read command and the further dispatching of the specific read command at least a first other read command and a second other read command are dispatched. The first other read command is also dispatched before the first dispatching of the specific read command. The second other read command is also further dispatched after the further dispatching of the specific read command.

By putting in between the first and further dispatching of a read request, read requests that link to the future and to the past, a better protection against fault is attacks is achieved.

In a preferred embodiment of the method according to the invention, substantially each received initial read request in the first series is dispatched at least a number of times in the second series. The number is at least 3. Between any two dispatchings in the second series of a specific received initial read request at least one other read request is dispatched.

In a practical embodiment of the method according to the invention, the method for secure data reading is preceded, interposed and/or followed by the following steps: configuring the memory in a test mode wherein the memory is arranged to produce a predetermined fixed response to a test read request; dispatching the test read request; and/or reconfiguring the memory in a non-test mode; producing the anomaly signal if a test result produced by the memory in response to the test read request does not agree with the predetermined fixed response to the test read request.

A read request in test mode, i.e. a read-known-answer read request, to the memory checks for the presence of a fault attack right at that very moment. This is particularly advantageous when an apparatus employing a method according to the invention is started. This guarantees that no fault attack was present when this series was started up. It is important that the method for secure data reading is not under a fault attack when the method commences. This can be achieved by preceding the method with a test read in a test mode.

If the method according to the invention is used for some types of memory the CPU will slow down. For example, when using EEPROM or Flash-based memories, such slow-down can be expected. For this reason the method according to the invention may not necessarily be always active, but may only be used if the code to be executed, or the data to be read, is especially security-sensitive. In such a situation it is particularly advantageous to use a read request in test mode, in order to detect whether a fault attack may already be active when the method is started.

In a preferred embodiment of the method for secure data reading according to the invention, the method comprises the following step: selecting a random time interval. The dispatching of the further first read request is delayed by the random time interval.

If a substantially constant time period occurs between the dispatching of the first read request and of the further first read request, a multiple fault attack can be attempted by timing a second fault attack after the constant time period has elapsed after a first fault attack. By delaying the further first dispatching for a random time, the second fault attack cannot be timed accurately.

This embodiment has the advantage that a multiple fault attack is harder to accomplish.

A random time interval may be selected as follows: first a random number in an interval, for example, the interval from 1 to 10, may be chosen, using a pseudo-random, or a true-random, number generator. Second, a time period is selected by multiplying the random number with a unit of time, for example by multiplying the random number with 1 microsecond.

An alternative way to introduce random delays is by introducing random steps in the method.

For example, a random step can be selected as follows: first a random number in an interval, for example, the interval from 1 to 10, may be chosen, using a pseudo-random, or true-random, number generator. If the random number is below a certain predetermined number, for example, 2, a test read is introduced in the series of dispatchings. If the test read is introduced before the dispatching of the further first read request, the dispatching of the further first read request is thus delayed.

In a preferred embodiment of the method for secure data reading according to the invention the memory produces data bits and parity bits, wherein the method comprises the step of: verifying, using an error correcting code, that the parity bits relate to the data bits.

Combining interleaved reading with parity bits provides additional protection in certain circumstances, as is expanded upon below.

The data handling system according to the invention comprises an address dispatcher, for dispatching read requests to a memory and a means for executing the method according to the invention.

The means can be implemented using a processor executing software, i.e. a computer program. The means can also be implemented using a state machine. The software or the state machine executes the method according to the invention.

The means for dispatching and the means for producing the anomaly signal may be combined in one means or be separated. It is advantageous to combine them if the memory is not integrated in the system. For best security the means for producing the anomaly signal is combined with the entity that produces read request, e.g., a CPU.

For example, a data handling system comprising a CPU can be configured for reading data according to the invention by executing a suitable software program. In this way the data reading can be protected without the need for hardware modifications.

In a preferred embodiment of the data handling system according to the invention, the address dispatcher comprises: a read request input, a first read request queue, a second read request queue and a multiplexer. Each read request queue is configured to buffer at least one read request occurring at the read request input and is configured to output a read request to the multiplexer. The multiplexer is configured to select a read request queue and forward a read request from the selected read request queue to the memory.

A read request queue is typically a First-In-First-Out buffer (FIFO). The queue has a certain capacity for buffering a number of read requests.

According to this embodiment a series of dispatchings according to the invention can be produced with minimal hardware means. Note that the capacity of a read request queue could be as little as a single read request.

In a preferred embodiment of the data handling system according to the invention, the system comprises an anomaly signal producer. The anomaly signal producer comprises: a demultiplexer, a first result queue, a second result queue and a comparator (306). The demultiplexer is configured to receive from the memory a data object. The demultiplexer is configured to forward the data object to the first result queue or to the second result queue. The comparator (306) has access to a head of the first queue and a head of the second queue. The comparator (306) is configured to produce the anomaly signal if at a predetermined moment the head of the first queue does not agree with the head of the second queue.

A result queue has a certain capacity for buffering a number of read request results.

Note that the capacity of a result queue could be as little as a single read request result.

According to this embodiment the anomaly signal can be produced with minimal hardware means.

In a practical embodiment of the data handling system according to the invention, the memory is integrated in the system.

In a practical embodiment of the data handling system according to the invention, the system is embodied in any one of: a smart card, a set-top box, a mobile phone and a personal digital assistant. In this context it is noted that the invention also relates to a device, particularly any one of a smart card, a set-top box, a mobile phone and a personal digital assistant, provided with the data handling system according to the invention.

This invention can be incorporated to advantage into IC's used for banking and eGovernment applications where high-level tamper-resistance is required. Also, a system that needs a security certification, such as Common Criteria (CC) certifications, e.g., EAL 4+ and higher levels, can benefit from the invention.

The computer program product according to the invention comprises computer code for implementing the method according to the invention.

Embodiments of the computer program product include among others: a storage unit comprising the computer program, a server comprising the computer program. The computer code can be fabricated using various well known high-level programming languages, such as, C, C++ or Pascal. The computer code can alternatively be fabricated using low-level programming languages, such as assembly, machine codes or microcode.

Therefore, a method for secure data reading and a data handling system is provided. The method protects the data reading from fault attacks by repeating read request in an interleaved manner, in particular the method comprises the steps of dispatching a first read request; dispatching a second read request; dispatching a further first read request; and producing an anomaly signal if a first result produced by the memory in response to the first read request does not agree with a further first result produced by the memory in response to the further first read request.

It is to be noted that the published international patent applications WO 2004/049349 and WO 2007/020567, both incorporated herein by reference, disclose an arrangement for reading from a Non-volatile (NV) memory while activating its test mode, by disabling all word lines (DAW). While reading from the memory in the test mode the memory produces an expected read data value. A read result deviating from this value directly indicates an external influence, such as, a light attack on the matrix bit lines or on the sense amplifiers.

A test mode is also called: read-known-answer mode.

Using the method of WO 2004/049349 and WO 2007/020567, one can interpose in the stream of real read requests a dummy read request, wherein a read request is executed while the memory is configured in a test mode. By verifying if the result that the memory produces in response to the dummy read request is the known result, a fault attack can be detected. A problem with that method is that any real read request is not safeguarded. One cannot guarantee that the real read request was not hit by a fault attack, if the fault attack was very short and affected only the real read request but not the dummy read request. Short fault attacks, such as short light flashes, cannot reliably be detected using that method.

International patent applications WO 2004/049349 and WO 2007/020567 do not combine the use of reading in test mode with repeated and interleaved read request.

BRIEF DESCRIPTION OF THE DRAWINGS

The invention is explained in further detail, by way of example and with reference to the accompanying drawing, wherein:

FIG. 7. is a diagram showing series of dispatchings D1-D5, produced by various embodiments of the method for secure data reading according to the invention.

Throughout the Figures, similar or corresponding features are indicated by same reference numerals.

Figure 1:
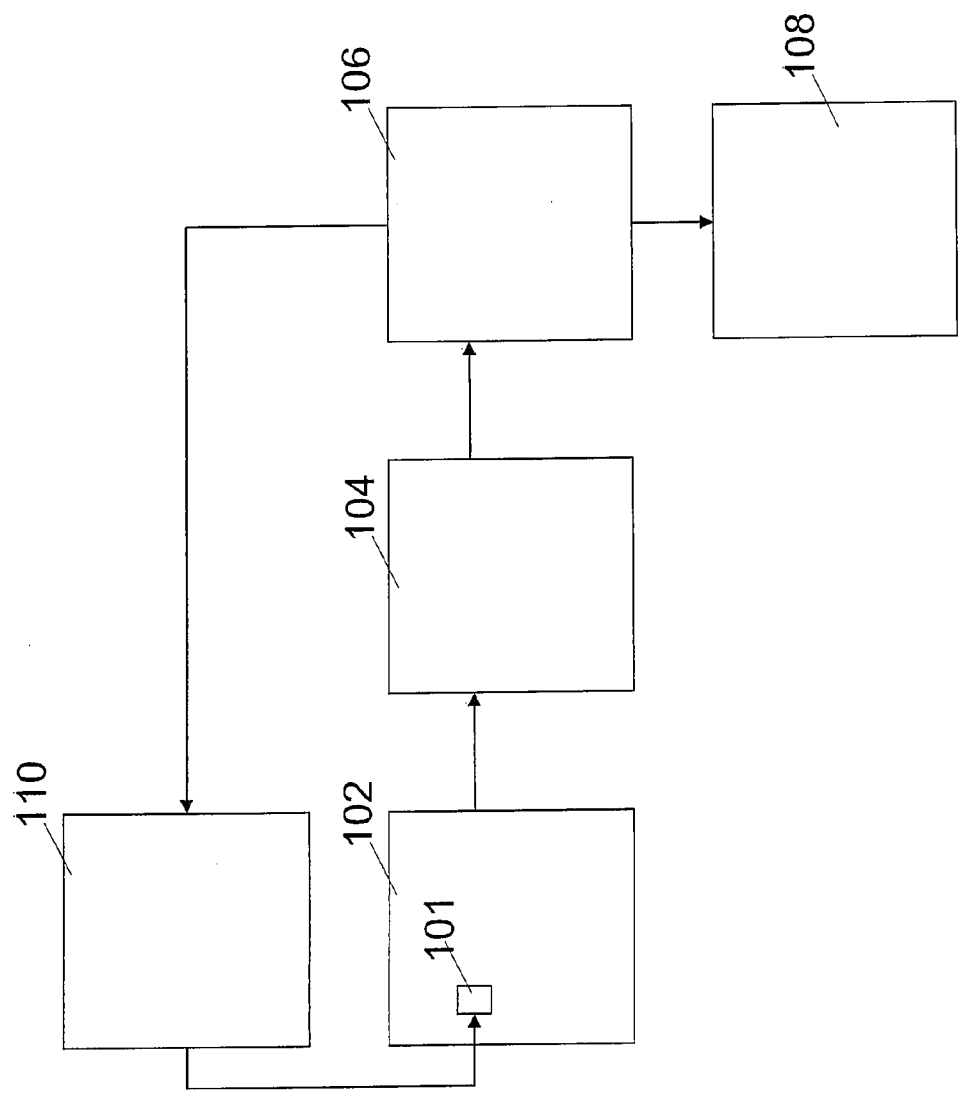
FIG. 1 is a block diagram showing an application of the method for secure data reading according to the invention in a data handling system.

LIST OF REFERENCE NUMERALS 100 a data handling system
101 a read request input
102 an address dispatcher
104 a memory
106 an anomaly signal producer
108 an anomaly handler
110 a CPU
202 a first read request queue
204 a second read request queue
206 a multiplexer
300 a demultiplexer
302 a first result queue
304 a second result queue
306 a comparator
400 a device, such as a smart card
(M101) configuring the memory in a test mode
(M102) dispatching the test read request
(M103) reconfiguring the memory in a non-test mode
(M200) dispatching a first read request
(M300) configuring the memory in a test mode
(M400) dispatching a second read request
(M450) reconfiguring the memory in a non-test mode
(M500) selecting a random time interval
(M600) dispatching a further first read request
(M650) dispatching a more further second read request
(M700) dispatching a third read request
(M800) dispatching a further second read request
(M900) dispatching a further third read request
(M1000-a) producing an anomaly signal if a first result produced by the memory in response to the first read request does not agree with a further first result produced by the memory in response to the further first read request
(M1000-b) producing the anomaly signal if a second result produced by the memory in response to the second read request does not agree with expectancy data associated with the second read request
(M1000-c) producing the anomaly signal if a third result produced by the memory in response to the third read request does not agree with a further third result produced by the memory in response to the further third read request
(M1001) producing the anomaly signal if a test result produced by the memory in response to the test read request does not agree with the predetermined fixed response to the test read request

DETAILED EMBODIMENTS

While this invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described.

In FIG. 1 a block diagram is shown illustrating a data handling system (100) capable of performing the method according to the invention.

The data handling system (100) comprises an address dispatcher (102), a memory (104), an anomaly signal producer (106), an anomaly handler (108) and a CPU (110). The address dispatcher (102) comprises a read request input (101). The system is embodied in a device (400), in this example a smart card.

The CPU (110) is connected to the address dispatcher (102) with a connection that is capable of transporting a read request. The address dispatcher (102) is connected to the memory (104), with a connection that is capable of transporting a read request. The memory (104) is configured for retrieving a data object in response to a read request. The memory (104) is arranged for forwarding the retrieved data object to the anomaly signal producer (106). The anomaly signal producer (106) is configured to examine the data objects retrieved by the memory (104) in a manner compatible with the method of dispatching used by the address dispatcher (102). The anomaly signal producer (106) is configured to conditionally send an anomaly signal to the anomaly handler (108).

In this embodiment the anomaly signal producer (106) is configured to send the retrieved data object to the CPU (110). The anomaly handler (108) is configured to take corrective action in case the anomaly handler (108) receives the anomaly signal.

During operations, the CPU (110) executes software. The software is typically: an application, operation system software, a library, system security code, or a network protocol. For example, the CPU (110) may execute a banking application that needs to verify a PIN number. For example, the CPU (110) may execute a booting sequence, and needs to verify if the boot image is genuine.

The CPU (110) needs some data object from the memory (104). For example, the CPU (110) needs to know the next instruction to execute, or the next data object to operate on. The CPU (110) sends the read request to the read request input (101) comprised in the address dispatcher (102). The address dispatcher (102) decides how to schedule the read request, e.g., the address dispatcher (102) decides how often and when the read requests occurring at input (101) should be dispatched to the memory (104). The address dispatcher (102) employs a method according to the invention, as described below.

If the address dispatcher (102) dispatches the read request, the read request is transported to the memory (104). The read request instructs the memory (104) to retrieve one or more data objects. Typically, the read request comprises an address that represents a region, i.e. one or more locations, such as memory cells, in the memory (104). The memory (104) retrieves at least the data objects that the read request instructs it to retrieve and forwards the data objects to the anomaly signal producer (106).

The anomaly signal producer (106) buffers the result of the read request, and/or compares the result of the read request with a result that was buffered earlier in response to an earlier similar read request. If the anomaly signal producer (106) finds that it has received a series of data objects that indicates a fault in the memory (104) or a fault attack, such as a light attack, the anomaly signal producer (106) produces the anomaly signal, and sends the anomaly signal to the anomaly handler (108). The anomaly signal producer (106) employs a method according to the invention, as described below.

The anomaly signal can consist of a single bit of information, indicating that a fault has occurred. The anomaly signal can also comprise all relevant information needed for, e.g., debugging the application, and/or for allowing the anomaly handler (108) to make a correct decision.

The anomaly handler (108) is configured to take corrective action in case the anomaly handler (108) receives the anomaly signal. Corrective actions can include: logging the event, terminating the application, shutting down the system (100), initiating a system self-destruct sequence, blanking one or more memories, blanking and/or destroying one or more fuses, restarting the application, rebooting the system (100), repeating the read request that caused the anomaly signal, etc.

The anomaly handler (108) can also decide not to take action, for example, if the fault occurs during a low-security application, or if the fault occurs in a special debug mode.

The data handling system (100) can be made using dedicated hardware, such as electronic circuits that are configured for providing the functionality according to the invention. The data handling system (100) can be made from generic hardware that is controlled using software in operational use, or the data handling system (100) may comprise a combination of dedicated hardware, generic hardware and dedicated software to implement the data handling system (100).

The buffers and memories used, such as memory (104) or buffers (not shown), that may be comprised in the other components, such as the address dispatcher (102) and the anomaly signal producer (106), can be made from regular RAM memory, such a DRAM, SRAM or SDRAM, flash-memory, magnetic storage, such as a hard disk, or optical storage, or any other kind of suitable storage. Optionally, memory (104) may be ROM memory.

The method is most advantageous applied in case memory (104) is ROM, EEPROM, or Flash memory.

Memory (104) may be implemented as a memory bank.

The connections, between the address dispatcher (102), memory (104), anomaly signal producer (106) and anomaly handler (108) can be fabricated in a number of ways, for example, a connection can be done in series, parallel, or by using a bus.

The data handling system (100) has the advantage that it is suitable for executing the method according to the invention. Reading from the memory (104) is protected from fault attacks in a manner that protects against simple fault attacks on the memory (104), i.e. both against short fault attacks, and long fault attacks.

In a variant of this embodiment the memory (104) forwards the retrieved data objects to both the CPU (110) and to the anomaly signal producer (106), and the anomaly signal producer (106) does not forward the retrieved data objects to the CPU (110). This has the advantage that the CPU (110) gets slightly faster access to contents of the memory (104).

Figure 2:
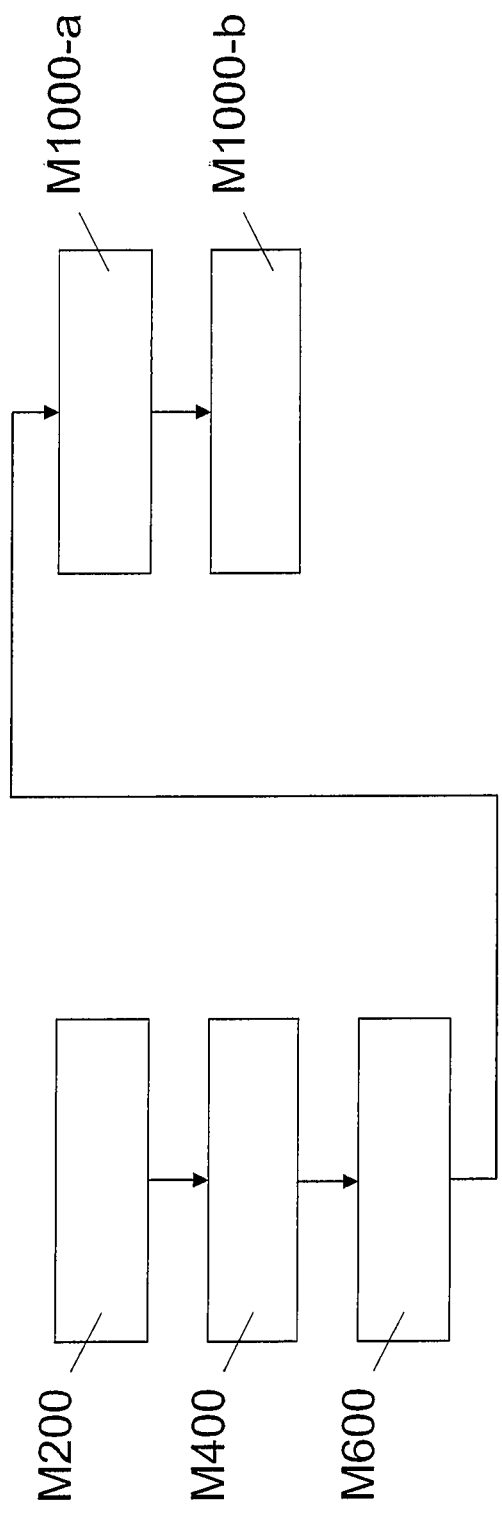
FIG. 2. is a flow chart illustrating a first embodiment of the method for secure data reading according to the invention.

In FIG. 2 a flow chart is shown that illustrates a first embodiment of the method for secure data reading according to the invention.

The first embodiment comprises the following steps: dispatching a first read request (M200), dispatching a second read request (M400), dispatching a further first read request (M600), producing an anomaly signal if a first result produced by the memory (104) in response to the first read request does not agree with a further first result produced by the memory (104) in response to the further first read request (M1000-$a$), producing the anomaly signal if a second result produced by the memory (104) in response to the second read request does not agree with expectancy data associated with the second read request (M1000-$b$).

Expectancy data associated with the second read request can come from a variety of sources, for example: by comparing with a further or earlier read request for the same data, by performing the second read request in a test mode, which will always give back an expected result.

The system (100) may also write a value to memory (104); this value can later be read back. Since the value of the written data is known, it can act as expectancy data.

Determining if the first result produced by the memory (104) in response to the first read request does not agree with the further first result produced by the memory (104) in response to the further first read request can be done in a variety of ways. For example, the determining may be done by comparing the two results bitwise.

Determining if the second result produced by the memory (104) in response to the second read request does not agree with the expectancy data associated with the second read request can be done in a variety of ways. For example, the determining can be done by comparing the second result produced by the memory (104) in response to the second read request bitwise with the expectancy data associated with the second read request.

The dispatching can occur in response to a received read request, for example, from a CPU (110). The dispatching can also occur autonomously, for example, when performing a fixed series of reading operations, for example, when reading a boot-image.

The order of the steps can be varied. For example, the producing of the anomaly signal (M1000-$b$) can be done at any time after the dispatching of the second read request (M400). For example, the producing of the anomaly signal (M1000-$b$) can be done before the producing of the anomaly signal (M1000-$a$).

The dispatching can be performed by a means for dispatching, such as the address dispatcher (102) or the CPU (110). The producing of the anomaly signal can be performed by a means for producing an anomaly signal, such as the anomaly signal producer (106), or a CPU (110). The method can be under the control of hardware, or under the control of software.

The method has the advantage that a short fault attack will be detected. If the short fault attack attacks the steps (M200) or (M600) then (M200) and (M600) will produce different results, since a memory (104) that retrieves during a fault attack, produces a different result from a memory (104) that is not under a fault attack. The anomaly signal producing (M1000-a) will detect that the result produced by the memory (104) in response to the dispatchings (M200) and (M600) is not the same. For example, the results can be compared bit wise. A short fault attack occurring during the step (M400) will be detected by producing (M1000-b), as the memory (104) will only produce an expected result in case the memory (104) is not under a fault attack.

A long fault attack will at least cover the step (M400) and will be detected by anomaly signal producing (M1000-b). If the long fault attack covers one but not two of the first dispatching (M200) and the further first dispatching (M600), the long fault attack will also be detected by anomaly signal producing (M1000-a).

Note that the method can be repeated, to read multiple data objects. The steps of repeated applications of the method can be combined to advantage as exemplified in embodiments below.

Figure 3:
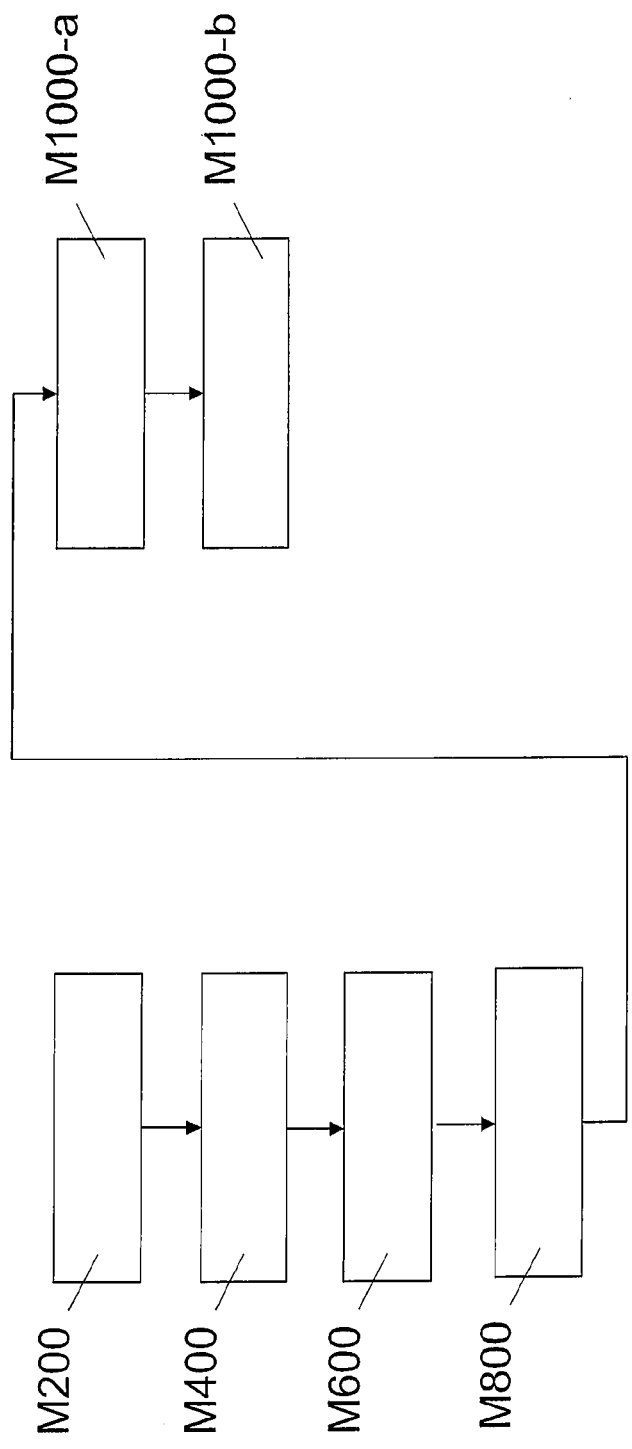
FIG. 3. is a flow chart illustrating a second embodiment of the method for secure data reading according to the invention.

In FIG. 3 a flow chart is shown that illustrates a second embodiment of the method for secure data reading according to the invention.

The second embodiments employs the same steps as the first embodiment but, in addition, performs a dispatching of a further second read request (M800). The dispatching (M800) is to be performed after the dispatching (M600) and before the anomaly signal producing (M1000-b).

In step (M1000-b), the expectancy data associated with the second read request is the further second result produced by the memory (104) in response to the further second read request.

This embodiment will detect all long fault attacks up to and including those covering 3 successive read requests. Only a fault attacks covering all four read requests may go undetected. Other embodiments, such as shown below, do not suffer from this limitation.

Figure 4:
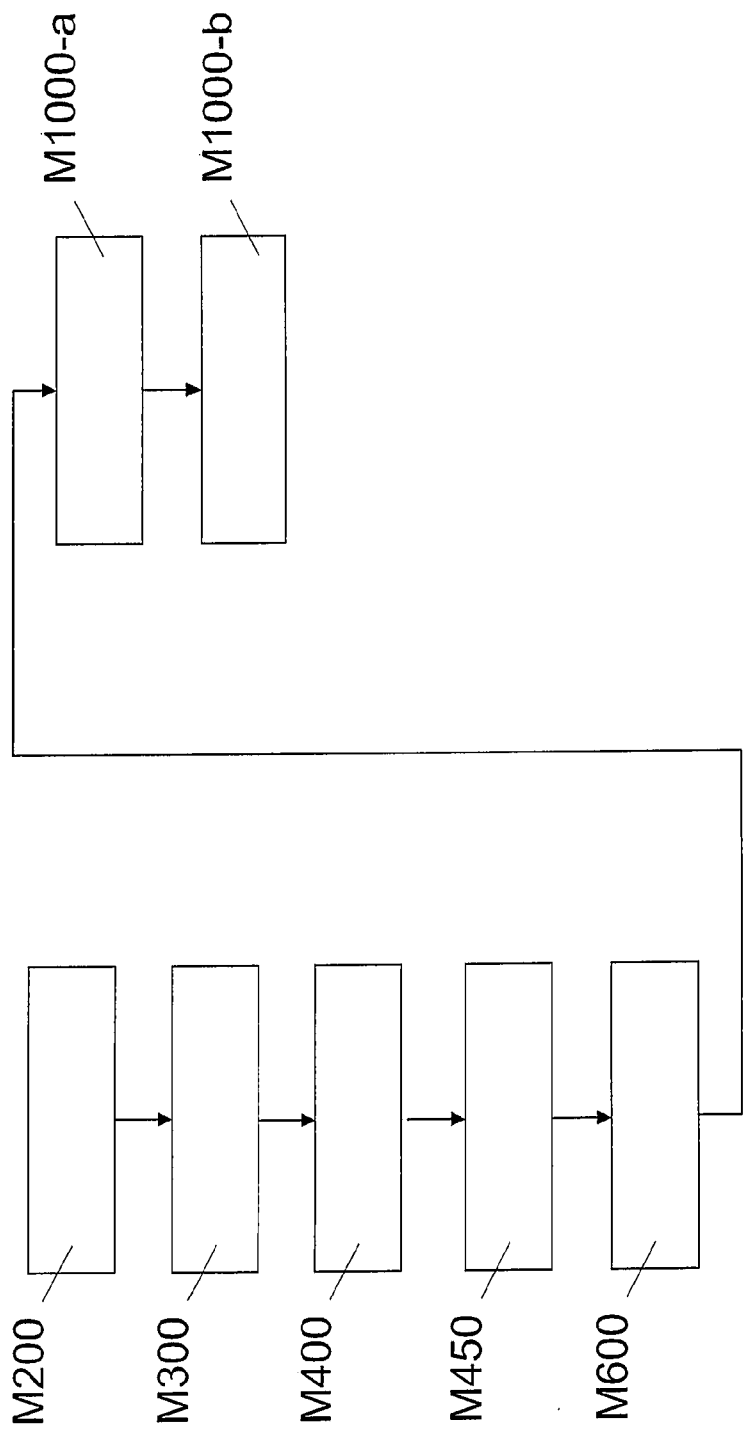
FIG. 4. is a flow chart illustrating a third embodiment of the method for secure data reading according to the invention.

In FIG. 4 a flow chart is shown that illustrates a third embodiment of the method for secure data reading according to the invention.

The third embodiment employs the same steps as the first embodiment but, in addition, performs the steps of configuring the memory (104) in a test mode (M300) and reconfiguring the memory (104) in a non-test mode (M450). The memory (104) has the property that, while configured in a test mode, the memory (104) will give an expected result, which is independent of the true content of the memory (104). The expected result may be constant for all read requests dispatched to the memory (104), or the expected result may depend on the individual read request. For example, the memory (104), while configured in test mode, may always give a constant value, e.g., zero. Or the memory (104) may give a value depending on the read request, e.g., a copy of an address comprised in the read request.

The configuring (M300) is to be performed before dispatching the second read request (M400). The configuring (M450) is to be performed after the dispatching (M400) and before (M600).

A fault attack occurring during the dispatching (M400) will disturb the result given by the memory (104) in response to the second read request. This will be detected in the anomaly signal producing (M1000-b), as the expectancy data will no long agree with the second result produced by the memory (104).

Figure 5:
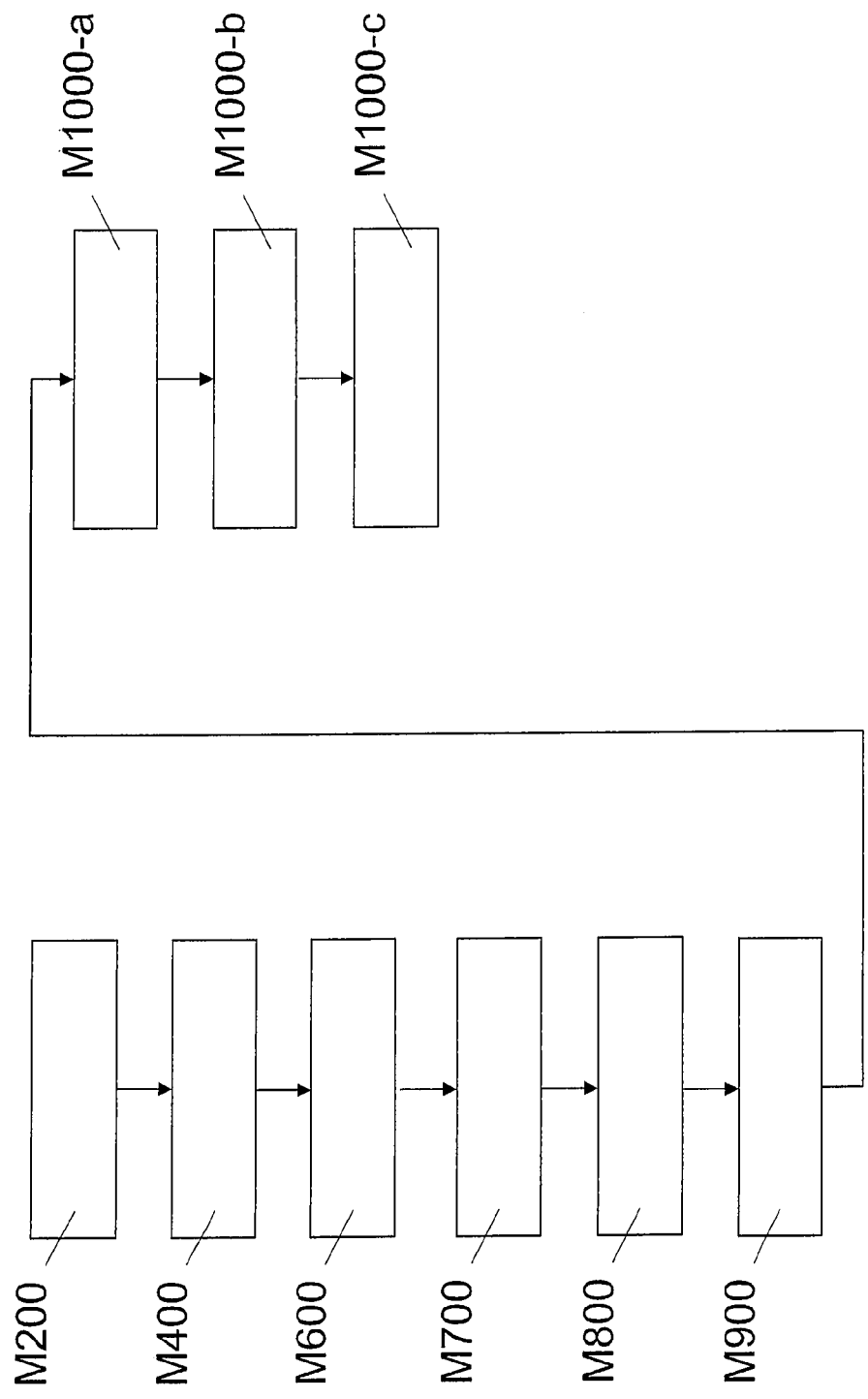
FIG. 5. is a flow chart illustrating a fourth embodiment of the method for secure data reading according to the invention.

In FIG. 5 a flow chart is shown that illustrates a fourth embodiment of the method for secure data reading according to the invention.

The fourth embodiment employs the same steps as the second embodiment with, in addition, the steps of dispatching a third read request (M700), dispatching a further third read request (M900) and producing the anomaly signal if a third result produced by the memory (104) in response to the third read request does not agree with a further third result produced by the memory (104) in response to the further third read request (M1000-c).

The dispatching (M700) is to be performed after the dispatching (M600) and before the dispatching (M800). The dispatching (M900) is to be performed after the dispatching (M800).

The anomaly signal producing (M1000-c) is to be performed after the dispatching (M900).

This embodiment has the advantage that it will detect all short fault attacks and all long fault attacks up to and including those covering 5 successive read requests. This embodiment is particularly suited for repeated application, as will be explained in relation to dispatched series D3 in FIG. 7, and in relation to FIG. 8 and FIG. 15.

Figure 6:
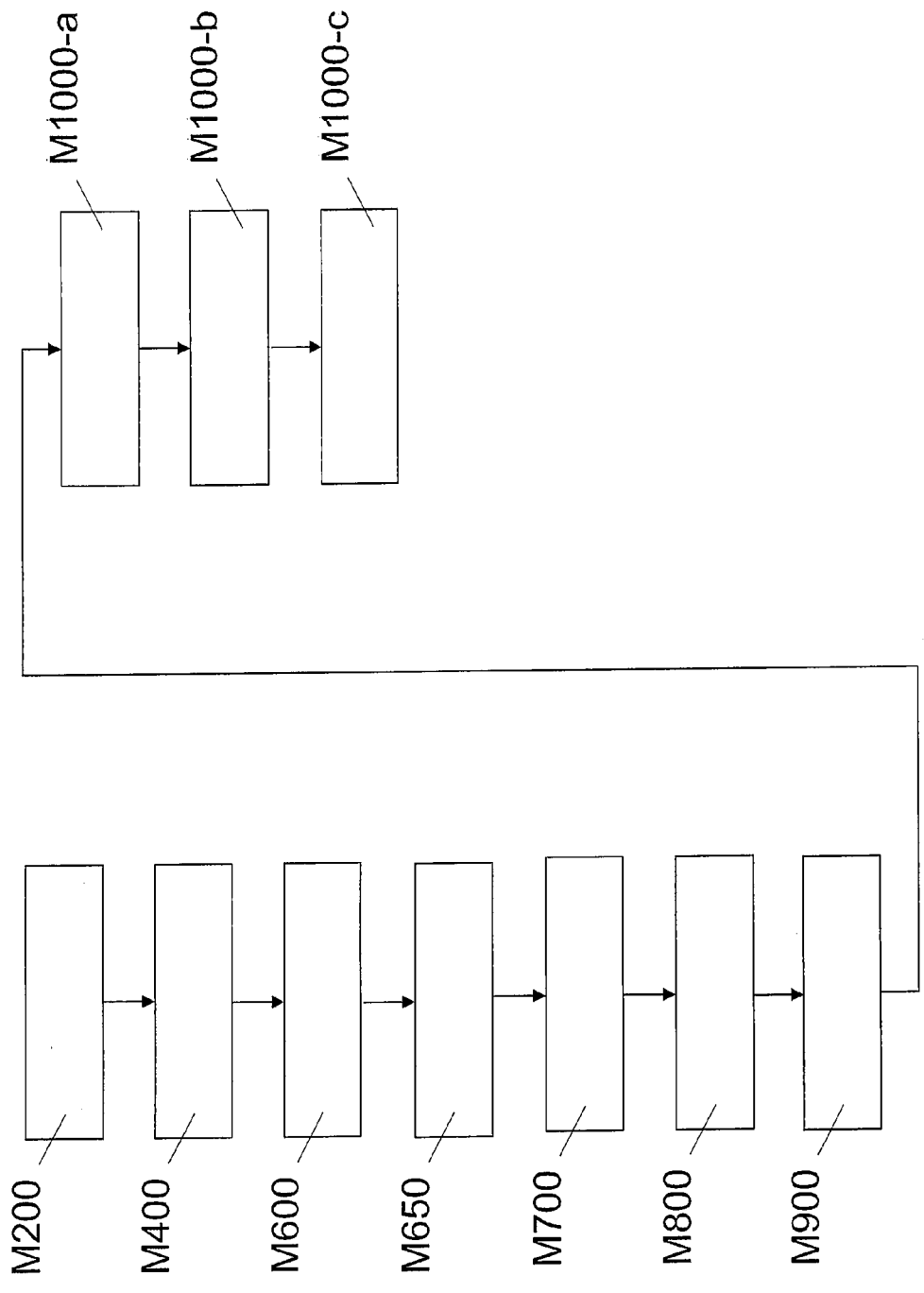
FIG. 6. is a flow chart illustrating a fifth embodiment of the method for secure data reading according to the invention.

In FIG. 6 a flow chart is shown that illustrates a fifth embodiment of the method for secure data reading according to the invention.

The fifth embodiment employs the same steps as the fourth embodiment with, in addition, the step of dispatching a more further second read request (M650). And step (M1000-b) is extended, in that the anomaly signal is also produced if the second result produced by the memory (104) in response to the second read request does not agree with a further second result produced by the memory (104) in response to the more further second read request.

In addition, to the advantages of the fourth embodiment, this embodiment will also detect some multiple fault attacks. The second read request, the further second read request and the more further second read request all need to produce results from memory (104) that are in agreement with each other. A multiple fault attack that attacks, e.g., the second read request and the further second read request, but not any other read request will be detected since the result of the more further second read request is not in agreement with the results of the second read request and the further second read request. Note, a simple long fault attack covering all of: the second read request, the further second read request and the more further second read request, but not read requests before the second read request or after the further second read request, will be detected as the dispatching of the further first read request will then also be disturbed, which will be detected by the anomaly signal producing (M1000-a). Also, the dispatching of the third read request will be disturbed, which will be detected by the anomaly signal producing (M1000-c).

In a similar manner the method can be extended to perform multiple dispatchings for each individual read request. In general, by dispatching each read request 'N+1' times and interleaving different read requests, a multiple fault attack employing 'N' independent faults, such as glitches or flashes, can be detected.

In FIG. 7 a number of series of dispatchings are shown produced by various embodiments of the method for secure data reading according to the invention.

It is most advantageous if the method of interleaved repeated readings as defined in the claims continues across multiple read requests. In this case all the multiple read requests are protected against fault attacks.

Series R show a series of read request reference numbers. The read requests have been numbered with the integers. Note that the numbers shown in series R are only references for the read requests, not the read requests themselves. In particular, it may be that two or more of the read requests are requests for the same region in the memory (104).

In the dispatched series D1, D2, D3, D4 and D5, a non-positive number, e.g., zero or lower, refers to a non-standard read request, e.g., a read in test mode. The read requests with a non-positive reference number can also be omitted. For clarity those read requests have been put between square brackets.

Series of dispatchings D1, can be obtained as follows. Each specific read request is dispatched, followed by a test read, followed by the further specific read request.

For each of the series of dispatchings D2, D3, D4 and D5 a series of differences between consecutive read request reference numbers is given, in I2, I3, I4, and I5, respectively. Note that the series of differences between consecutive read request reference numbers is cyclic in the examples, wherein the cycle that repeats is indicated in italic numbers. The series of differences can simply be extended by continuing the repetition of the cycle. To go from a series of differences to a series of dispatchings, the sequence of partial sums can be computed.

For example, by computing the sequence of partial sums of sequence I3, sequence D3 is constructed. The sequence of partial sums is obtained by starting with read request 1 and adding alternatively (−1) and 2.
The first few partial sums are:
1=1,
0=1+(−1),
2=1+(−1)+2,
1=1+(−1)+2+(−1),
3=1+(−1)+2+(−1)+2,
2=1+(−1)+2+(−1)+2+(−1),
4=1+(−1)+2+(−1)+2+(−1)+2,
3=1+(−1)+2+(−1)+2+(−1)+2+(−1),
5=1+(−1)+2+(−1)+2+(−1)+2+(−1)+2, etc.

Figure 8:
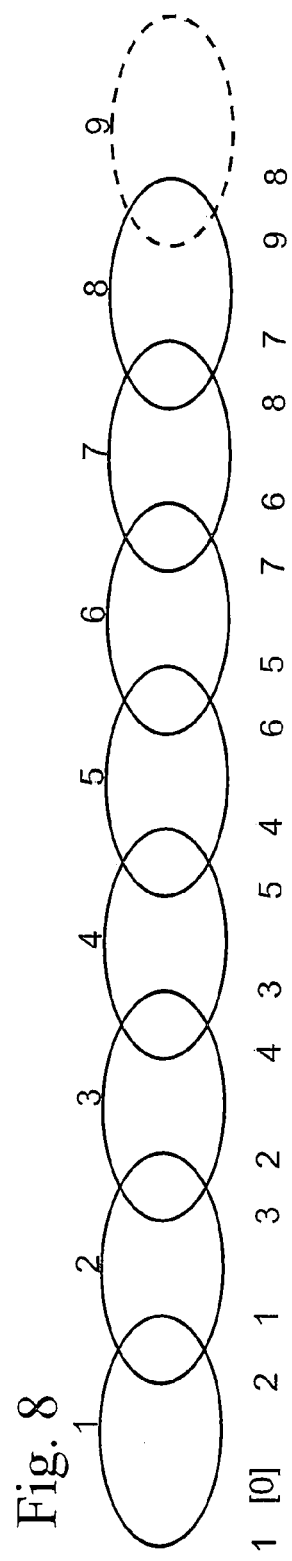
FIG. 8 is a graphical depiction of the series of dispatching D3.

Note, that although it is advantageous if the series of differences is cyclic, this is optional In FIG. 8 a graphical depiction of series of dispatching D3 is given. The graphical depiction is a more intuitive representation and is created by drawing a chain where each link in the chain corresponds to one read request. The left-hand side of the link denotes when the read request is read for the first time, whilst the right-hand side refers to the $2^{nd}$ reading, i.e. the further read request.

Here [0] is a special read request that is not strictly required, but could be implemented, for instance, as a read-known-answer access to the memory (104) to check for the presence of a fault attack right at that very time. This then guarantees that the fault attack was not already present when this series was started up. For any specific read request that follows one finds that the specific read request occurs twice in the series, i.e. a first specific read request and a second specific read request. In-between these two specific reads requests there are two other specific read requests. A first other specific read request is a read requests that also occurs logically before the first specific read request in the series. The second other specific read request also occurs logically after the second specific read request. This is very much like a physical chain where each element is linked to its predecessor as well as its successor, using a single forward-/backward link.

For instance, in
... 3 2 4 3 5 4 6 5 ....
the read request 4 is read twice, yet between the two read requests 4, read request 3 and read request 5 are read precisely once each. This implies that if the fault attack is, e.g., long enough to compromise all values read between the first and the last read request 4, then read request 3 and read request 5 will also be compromised. In such a case comparing the two values produced in response to read request 4 are not likely to find a difference, but instead comparing the two values produced in response to read request 3 will reveal that an attack is taking place.

Also, comparing the values produced for read request 5 would detect this attack, but the comparison for read request 3 would usually happen first. Similarly, one can analyze the effect of longer and shorter fault attacks, all of which will yield at least two read requests where the comparison does not match. This interleaved ordering of double-reads can very effectively detect light attacks.

Under some circumstance it may happen, that a device under a light attack fails to react. In the sequence given above, suppose that a light flash starts at the second read request and lasts until the further second read request. If the circumstance occurs for the further third read request, that is, if the further third read request is somehow not affected by the light, the verification of the results of the third and further third read request is not detected. However, in this case the fault attack will be detected during the verification done for the further fifth read request.

What one, in effect, is doing here is detecting the switching on of the light flash, and not the presence of the light flash itself. Because of this, it does not really matter how long the flash actually lasts. If, on the other hand, one is worried that the fault attack might already be in operation before this checking has started, then the [0] read mentioned earlier can be used to detect the presence of the light flash as such by performing, e.g., a read-known-answer access to the memory (104).

Figure 9:
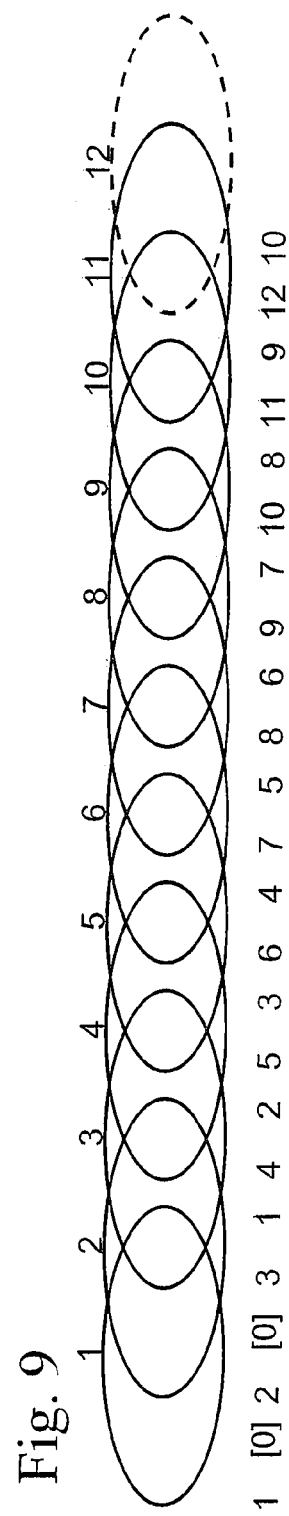
FIGS. 9, 10, 11, 12 and 13 are graphical depictions of various series of dispatchings according to the invention.

In FIG. 9 graphical depictions of a series of dispatchings according to the invention are given.

The sequence of FIG. 9, which is also illustrated by sequence D4, can be produced by extending the cyclic sequence I4 and then creating the sequence of partial sums. Sequence D4 is an improvement over the sequence of D3, as given in FIG. 7 and illustrated by FIG. 8.

In situations where a single light flash attack can focus on just a single bit, it may happen that the reading of the bit is unaffected by the light flash. This may happen more often for some states of the bit, e.g. in the '1' state, than in other states of the bit, e.g. in the '0' state. In this situation it is advantageous to have, between the first and further first read request more read request that are repeated elsewhere. For example, sequence D4 contains the following subsequence:
..., 1, 2, 3, 1, 4, 2, 5, 3, 4, 5, ....

Here the first occurrence of a specific number refers to the first time that a specific read request is made. The second time the specific number occurs refers to the further time the specific time a request is made.

Consider a light attack extending from read request 3 to the further read request 3, (indicated by underlining in the subsequence above). This fault attack can be detected by the method 4 times. The fault attack will disturb further read request 1, read request 4, further read request 2 and read request 5, but not their respective read request or further read request. This means that, even if one of these associated checks fails, the method still has 3 other opportunities to detect the fault attacks. Compared to sequence D3, the number of detection moments is doubled, correspondingly increasing the probability the fault attack will be detected.

Even though the chances of detecting a fault attack, using the sequence D4 instead of sequence D3, have increased, the sequence D4 still only needs double reads, and hence it consumes a comparable amount of power as sequence D3.

In a further embodiment of the method for secure data reading according to the invention, parity bits are used.

Data words, comprising data bits, are stored in a memory along with corresponding error correcting data, also known as parity bits. The error correcting data is produced using an error correcting code (ECC). In a read request the data bits are read along with the parity bits. If the read data bits do not correspond to the parity bits, an error is detected. As this error may be the result of a fault attack the method has the option of producing the anomaly signal. This correspondence can be determined using an error detection mechanism of the error correcting code.

The data words are read using any one of the methods of interleaved repeated reading according to the invention. For example, the data words along with their parity bits, are read using the method illustrated in FIG. 3.

The combination of interleaved repeated reading with parity bits is surprisingly effective in the situation set out in the discussion of FIG. 9. In such a situation, some read requests may be more vulnerable to light attacks than others. It is assumed for the sake of argument that the parity bits are only capable of detecting single bit errors, that is, the weakest possible kind of error correcting code is assumed. Moreover, assume that some bit values are completely invulnerable to light attacks; for example, say, bit values of 0 are invulnerable. Even under these weak assumptions the parity bits combined with the interleaved reading provide a synergy and give more protection than could be expected from a consideration of the component parts.

Consider the sequence of read request below:
...1 2 1 2...,
wherein a light attack is extended over the underlined read request. Read requests 1 and 2 correspond to data words 1 and 2 respectively.

Without the use of parity bits, an attacker may focus his light attack on a single bit of data words 1 and 2. If it happens that the attacked bit in data word 1 is vulnerable but the attacked bit in data word 2 is not, the light attack may go unnoticed. The probability of the attacked bit in data word 2 to be invulnerable is ½.

However, using parity bits the change to the attacked bit in data word 1 would be noticed by the error correcting code, and the attack would be thwarted. As a result it becomes pointless for the attacker to focus on single bits, as the only way for an attack on a single bit to go unnoticed, would be if all of the attacked bits were of the invulnerable type, in which case the attack has no effect whatsoever. It is seen, that parity bits are an effective countermeasure against attacks focusing on single bits.

The parity bits force the attacker to attack at least 2 bits. When attacking 2 bits, the parity bits provide, on their own, little protection, as they are only capable of detecting single bit errors. However the chances of both attacked bits in data word 2 to be invulnerable drops to ½*½=¼.

Thus, one finds that these two countermeasures are not merely additive in their effects but rather strengthen each other beyond that.

Figure 10:
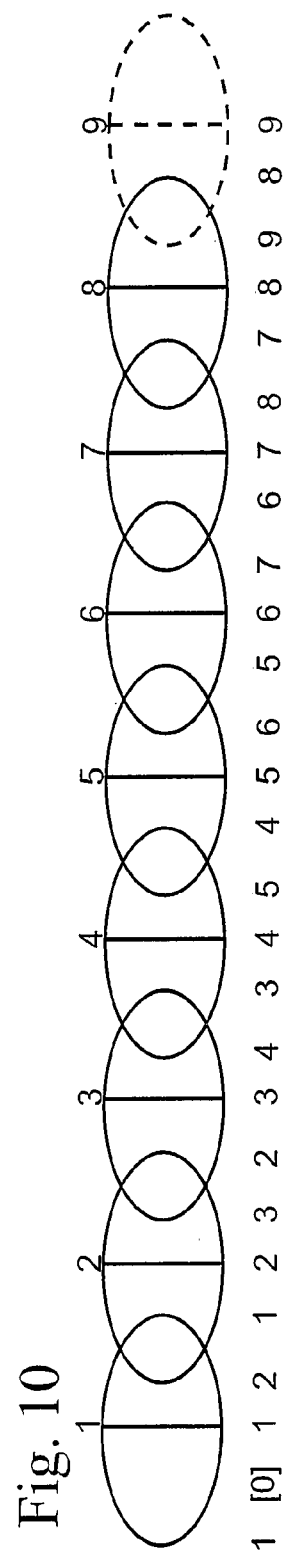
Figure 11:
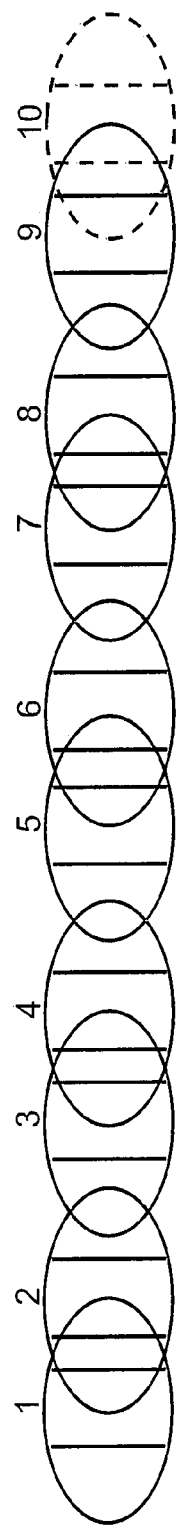
Figure 12:
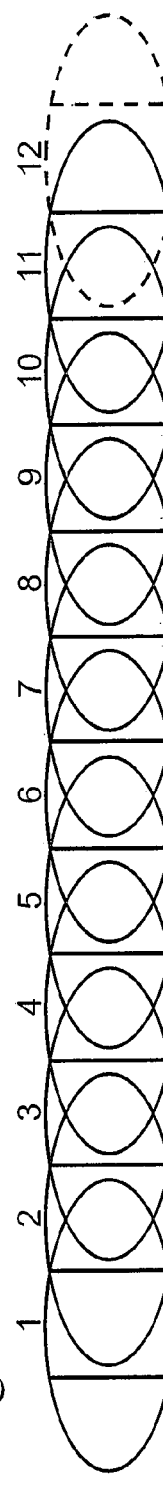
Figure 13:
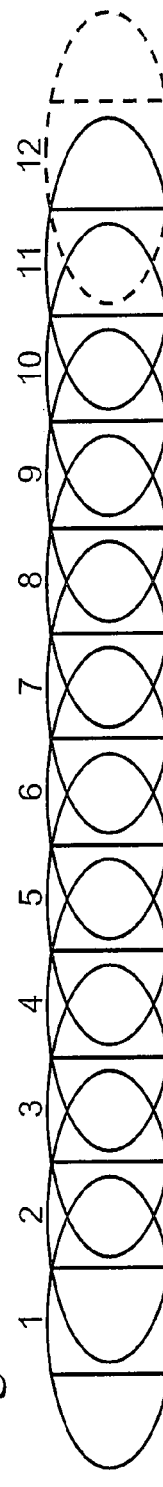

In FIGS. 10, 11, 12 and 13 graphical depictions are given of various series of dispatchings according to the invention. In FIG. 10 a series with triple read requests is given, in order to also indicate the middle read request, each chain link has a single cross bar. The sequence of FIG. 10 protects against multiple fault attacks, in which two independent faults are possible. FIGS. 11, 12, and 13 show series with quadruple read requests, using chain links with two cross bars. The sequences of FIGS. 11, 12 and 13 protect against multiple fault attacks in which three independent faults are possible.

Figure 14:
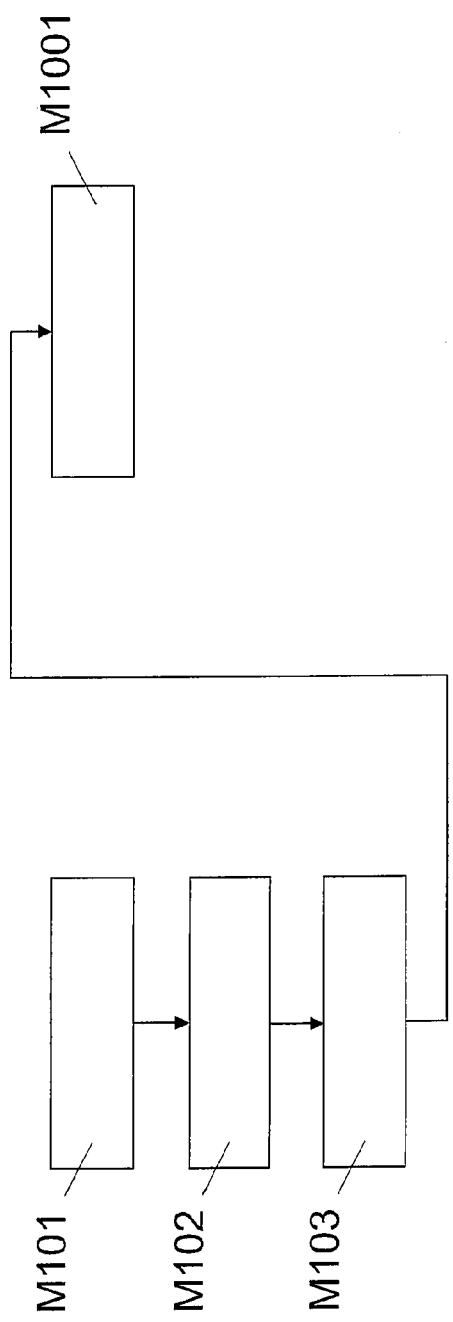
FIG. 14. is a flow chart illustrating a method for dispatching a test read request.

In FIG. 14 a flow chart is given, illustrating a method for dispatching a test read request. The method comprises the following steps: configuring the memory (104) in a test mode (M101), dispatching the test read request (M102), reconfiguring the memory (104) in a non-test mode (M103), producing the anomaly signal if the test result produced by the memory (104) in response to the test read request does not agree with the predetermined fixed response to the test read request (M1001).

The configuring (M101) is performed before the dispatching (M102). The dispatching (M102) is to be performed before the configuring (M103). The anomaly signal producing (M1001) is to be performed after the dispatching (M102).

The configuring (M101) and (M103) may be integrated in the dispatching (M102).

The method for secure data reading is capable, especially when dispatching a series of read requests, of detecting very long fault attacks. It is, however, important, that no fault attack is occurring before the method is started. By performing a test read, i.e. a read-known-answer, at the start, it can be determined whether the fault attack is not yet operating.

Figure 15:
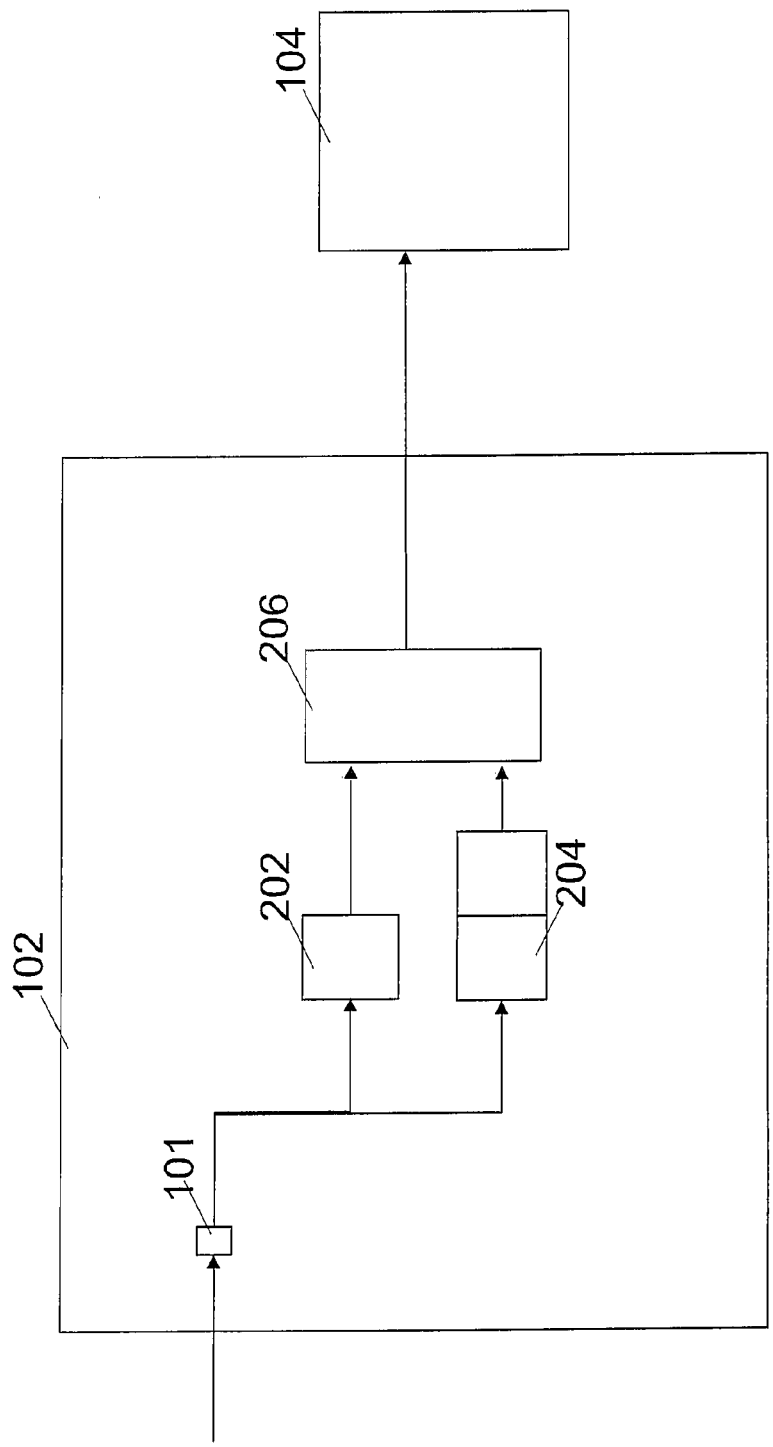
FIG. 15. is a block diagram showing a further embodiment of an address dispatcher.

In FIG. 15 a block diagram is shown illustrating a further embodiment of an address dispatcher (102), which can be used in the data handling system (100).

The address dispatcher (102) comprises a read request input (101), a first read request queue (202), a second read request queue (204) and a multiplexer (206).

The read request input (101) is configured for receiving a read request. The read request input (101) is connected to both the first read request queue (202) and the second read request queue (204). The read request is buffered by both the first read request queue (202) and the second read request queue (204). In this embodiment the first read request queue (202) has a capacity for buffering one read request, the second read request queue (204) has a capacity for buffering two read requests. The number of read request queues can be varied, as can their capacities. This will result in different dispatching series, with different properties.

The multiplexer (206) reads alternately from the head of the first read request queue (202) and the head of the second read request queue (204). Initially, both the read request queues may be filled with a dummy read request representing a test read, in the example below indicated with a '0'.

In the example below, a specific read request is indicated with a specific reference number. Equal reference numbers indicate equal read requests. Note that in practice, typically, actual read requests instead of reference numbers would be handled by the address dispatcher (102).

Multiplexer (206) is connected to the memory (104), with a connection that is capable of transporting a read request.

In operation, read request 1 occurs on read request input (101). As a result, the first read request queue (202) will contain (1), the second read request queue (204) will contain (1, 0). The multiplexer (206) will read the read request 1 from the first read request queue (202) and a test read from the second read request queue (204). The multiplexer (206) transports read requests 1, 0 to the memory (104).

Next, read request 2 occurs on read request input (101). As a result, the first read request queue (202) will contain (2), the second read request queue (204) will contain (2, 1). The multiplexer (206) will read the read request 2 from the first read request queue (202) and the read request 1 from the second read request queue (204). The multiplexer (206) transports read requests 2, 1 to the memory (104).

Next, read request 3 occurs on read request input (101). As a result, the first read request queue (202) will contain (3), the second read request queue (204) will contain (3, 2). The multiplexer (206) will read the read request 3 from the first read request queue (202) and the read request 2 from the second read request queue (204). The multiplexer (206) transports read requests 3, 2 to the memory (104).

Combined, the multiplexer (206) will transport to the memory (104), the read requests 1, 0, 2, 1, 3, 2, ..., one after the other.

The first and second read request queue (202) and (204) may be a First-In-First-Out buffer (FIFO), used as a queue.

The address dispatcher (102) in this embodiment has the advantage that little hardware and overhead is needed to produce a series of interleaved dispatchings according to the invention.

Figure 16:
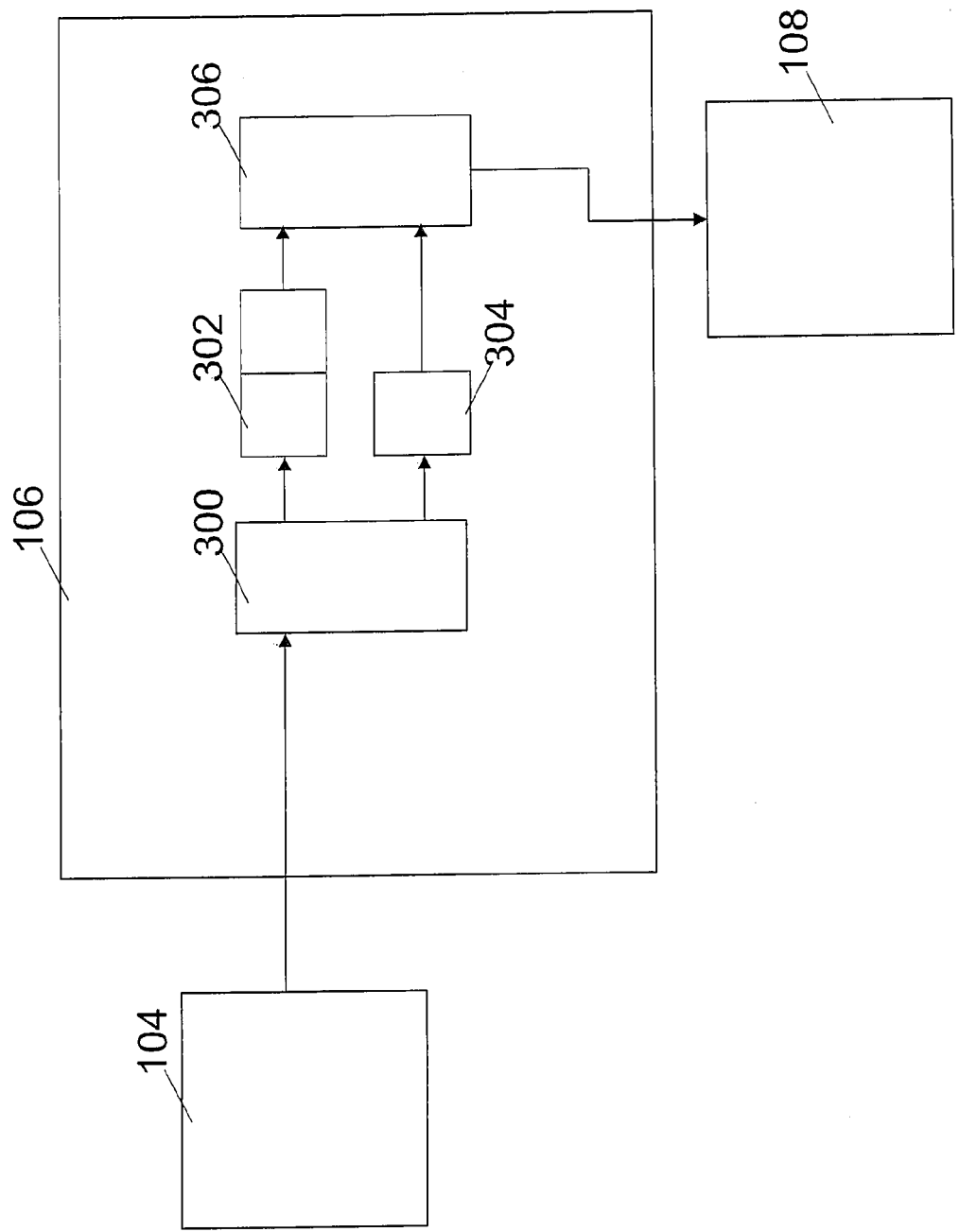
FIG. 16. is a block diagram showing a further embodiment of an anomaly signal producer.

In FIG. 16 a block diagram is shown illustrating a further embodiment of an anomaly signal producer (106), which can be used in the data handling system (100).

The embodiment of the anomaly signal producer (106), shown in FIG. 16, is intended to be used with the embodiment of the address dispatcher (102) shown in FIG. 15.

The anomaly signal producer (106) comprises a demultiplexer (300), a first result queue (302), a second result queue (304), and a comparator (306).

The demultiplexer (300) receives the results, e.g., data objects, produced by the memory (104) in response to read requests. The demultiplexer (300) is connected to the first result queue (302) and the second result queue (304). The comparator (306) can read and compare the heads of the result queues (302) and (304). The comparator (306) can produce an anomaly signal and forward the anomaly signal to the anomaly handler (108). The comparator (306) can also be connected to the entity that produced the read request, e.g., a CPU (110).

The result queues (302) and (304) are configured for buffering read request results. In this embodiment the first result queue (302) has a capacity for 2 read request results, the second result queue (304) has a capacity for 1 read request result. The number of result queues can be varied, as can their capacities. This will result in an anomaly signal producer (106) configured to verify a different dispatching series.

During operation, the demultiplexer (300) alternately forwards read request results to the first result queue (302) and to the second result queue (304). That is, the first received result is only forwarded to the first result queue (302), the second received result is only forwarded to the second result queue (304). Every other received result, the comparator (306) compares the heads of the two result queues (302) and (304) for agreement, e.g., equality. For example, after the first forwarding of the demultiplexer (300 the comparator (306) does not compare, after the second forwarding of the demultiplexer (300), the comparator (306) compares, after the third forwarding of the demultiplexer (300) the comparator (306) does not compare, after the fourth forwarding of the demultiplexer, (300) the comparator (306) compares, etc.

If the heads of the two result queues (302) and (304) do not agree, the anomaly signal is produced. If the heads of the two result queues (302) and (304) do agree, one of the heads is forwarded, e.g., to a CPU (110).

Initially, result queues (302) and (304) can be filled with the expected result of a memory test read request. In the example below, a specific result of the memory (104) is indicated with the reference number of the specific read request that caused the result. Note, that in practice, typically, actual data objects would be produced by the memory (104).

Suppose the memory (104) produces results in response to the series of dispatchings D3, i.e. the following the series of results: 1, 0, 2, 1, 3, 2, 4, 3, 5, ....

In operation, read request result 1 is sent to demultiplexer (300). Demultiplexer (300) forwards the read request result 1 to the first result queue (302). The content of the first result queue (302) is now (1, 0) and of the second result queue (304): (0).

Next, read request result 0 is sent to demultiplexer (300). Demultiplexer (300) forwards the read request result 0 to the second result queue (304). The content of the first result queue (302) is now (1, 0) and of the second result queue (304): (0). The comparator (306) compares the head of the first result queue (302) with the head of the second result queue (304), and finds that they are in agreement. The comparator (306) does not forward read request result 0 to the CPU (110) since it is a test read.

The comparator (306) has access to means to know that a test read was generated and what the expected answer was. For example, the comparator may be synchronized with the address dispatcher (102) and the comparator is configured to expect the dummy reads at the correct time. An additional complication would be if the memory (104) is encrypted and the known answer also flows through a decryption module. In that case, it will arrive at the comparator as a different value, i.e. as the decryption of the known answer. One solution is to have another queue fed with the known answer, generated at the decryption module, or have the queue filled with an independently generated known answer. The comparator has access to the other queue, and compares with the value in the queue if the queue is not empty.

Next, read request result 2 is sent to demultiplexer (300). Demultiplexer (300) forwards the read request result 2 to the first result queue (302). The content of the first result queue (302) is now (2, 1) and of the second result queue (304): (0).

Next, read request result 1 is sent to demultiplexer (300). Demultiplexer (300) forwards the read request result 1 to the second result queue (304). The content of the first result queue (302) is now (2, 1) and of the second result queue (304): (1). The comparator (306) compares the head of the first result queue (302) with the head of the second result queue (304), and finds that they are in agreement. The comparator forwards read request result 1 to the CPU (110).

Next, read request result 3 is sent to demultiplexer (300). Demultiplexer (300) forwards the read request result 3 to the first result queue (302). The content of the first result queue (302) is now (3, 2) and of the second result queue (304): (1).

Next, read request result 2 is sent to demultiplexer (300). Demultiplexer (300) forwards the read request result 2 to the second result queue (304). The content of the first result queue (302) is now (3, 2) and of the second result queue (304): (2). The comparator (306) compares the head of the first result queue (302) with the head of the second result queue (304), and finds that they are in agreement. The comparator forwards read request result 2 to the CPU (110).

The anomaly signal producer (106) continues in this manner.

The first and second result queue (302) and (304) may be a FIFO queue.

The anomaly signal producer (106) in this embodiment has the advantage that little hardware and overhead is needed to verify a series results in response to a series of dispatchings according to the invention.

The present invention, as described in embodiments herein, may be implemented using a programmed processor executing programming instructions that are broadly described above in flow chart form that can be stored on any suitable electronic storage medium. However, those skilled in the art will appreciate that the processes described above can be implemented in any number of variations and in many suitable programming languages without departing from the present invention. For example, the order of certain operations carried out can often be varied, additional operations can be added or operations can be deleted without departing from the invention. Error trapping, enhancements and variations can be added without departing from the present invention. Such variations are contemplated and considered equivalent.

The present invention could be implemented using special purpose hardware and/or dedicated processors. Similarly, general purpose computers, microprocessor based computers, digital signal processors, microcontrollers, dedicated processors, custom circuits, ASICS and/or dedicated hard wired logic may be used to construct alternative equivalent embodiments of the present invention.

Those skilled in the art will appreciate that the program steps and associated data used to implement the embodiments described above can be implemented using disc storage as well as other forms of storage, such as, for example, Read Only Memory (ROM) devices, Random Access Memory (RAM) devices, optical storage elements, magnetic storage elements, magneto-optical storage elements, flash-memory and/or other equivalent storage technologies without departing from the present invention. Such alternative storage devices should be considered equivalents.

While the invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims.

The invention claimed is:

1. A method for secure data reading for a data handling system, the method comprising an address dispatcher for dispatching read requests to a memory, comprising the steps of:
   dispatching a first read request;
   dispatching a second read request;
   dispatching a further first read request;
   producing an anomaly signal if a first result produced by the memory in response to the first read request does not agree with a further first result produced by the memory in response to the further first read request,
   wherein:
   the first read request is dispatched before the second read request is dispatched, and the second read request is dispatched before the further first read request is dispatched, wherein the method is characterized by comprising a first additional step, to be executed after the dispatching of the second read request; the first additional step comprising:
   producing the anomaly signal if a second result produced by the memory in response to the second read request does not agree with expectancy data associated with the second read request where the second result need not be a priori known or predictable and comprising a second additional step, to be executed after the dispatching of the further first read request, and before the producing of the anomaly signal; the second additional step comprising:
   dispatching a further second read request;
   wherein:
   the expectancy data associated with the second read request is a further second result produced by the memory in response to the further second read request.

2. A method for secure data reading as in claim 1, wherein the method comprises a third additional step, to be executed after the dispatching of the further first read request and before the dispatching of the further second read request, the third additional step comprising:
   dispatching a third read request;
   and wherein the method comprises a fourth additional step, to be executed after the dispatching of the further second read request, the fourth additional step comprising:
   dispatching a further third read request
   and wherein the method comprises an fifth additional step, to be executed after the dispatching of the further third read request, the fifth additional step comprising:
   producing the anomaly signal if a third result produced by the memory in response to the third read request does not agree with a further third result produced by the memory in response to the further third read request.

3. A method for secure data reading as in claim 2 wherein the method comprises a sixth additional step, to be executed after the dispatching of the further first read request, and before the dispatching of the third read request, the sixth additional step comprising:
   dispatching a more further second read request;
   wherein
   the anomaly signal is also produced if the second result produced by the memory in response to the second read request does not agree with a more further second result produced by the memory in response to the more further second read request.

4. A method for secure data reading as claimed in claim 1, wherein:
   the dispatching of read requests comprises receiving a first series of initial read request and dispatching a second series of read requests, the method being arranged to transform the first series into the second series;
   the second series comprises the dispatching of the first read request, the dispatching of the second read request and the dispatching of the further first read request;
   substantially each received initial read request in the first series is dispatched at least twice in the second series;
   between a first dispatching of substantially any specific read request and a further dispatching of the specific read request at least one other read request is dispatched;
   the other read request is different from the specific read request;
   the method comprises the step of producing the anomaly signal if a specific result produced by the memory in response to the first dispatching of the specific read request does not agree with a further specific result produced by the memory in response to the further dispatching of the specific read request.

5. A method for secure data reading as in claim 4, wherein:
   between the first dispatching of substantially any specific read request and the further dispatching of the specific read request at least a first other read request and a second other read request are dispatched;
   the first other read request is also dispatched before the first dispatching of the specific read request;

the second other read request is also further dispatched after the further dispatching of the specific read request.

6. A method for secure data reading as in claim 4, wherein:
substantially each received initial read request in the first series is dispatched at least a number of times in the second series;
the number is at least 3;
between any two dispatchings in the second series of a specific received initial read request at least one other read request is dispatched.

7. A method for secure data reading as in claim 1 wherein the method is preceded, interposed and/or followed by the following steps:
configuring the memory in a test mode wherein the memory is arranged to produce a predetermined fixed response to a test read request;
dispatching the test read request; and/or
reconfiguring the memory in a non-test mode;
producing the anomaly signal if a test result produced by the memory in response to the test read request does not agree with the predetermined fixed response to the test read request.

8. A method for secure data reading as claimed in claim 1 wherein the method comprises the following step:
selecting a random time interval;
and wherein the dispatching of the further first read request is delayed by the random time interval.

9. A method for secure data reading as in claim 1 wherein the memory produces data bits and parity bits, wherein the method comprises the step of: verifying, using an error correcting code, that the parity bits relate to the data bits.

10. A data handling system comprising an address dispatcher, for dispatching read requests to a memory, and a means for executing the method of in claim 1.

11. A data handling system as in claim 10 wherein the address dispatcher comprises: a read request input, a first read request queue, a second read request queue and a multiplexer, wherein:
each read request queue is configured to buffer at least one read request occurring at the read request input and is configured to output a read request to the multiplexer;
the multiplexer is configured to select a read request queue and forward a read request from the selected read request queue to the memory.

12. A data handling system as in claim 10, comprising an anomaly signal producer,
the anomaly signal producer comprising: a demultiplexer, a first result queue, a second result queue and a comparator,
wherein:
the demultiplexer is configured to receive from the memory a data object;
the demultiplexer is configured to forward the data object to the first result queue or to the second result queue;
the comparator has access to a head of the first result queue and a head of the second result queue;
the comparator is configured to produce the anomaly signal if at a predetermined moment the head of the first result queue does not agree with the head of second result queue.

13. A data handling system as in claim 10, wherein the memory is integrated in the system.

14. A data handling system as in claim 10, embodied in any one of:
a smart card,
a set-top box,
a mobile phone, and
a personal digital assistant.

15. A computer program product comprising computer code for implementing the method as defined in claim 1.

16. A method for secure data reading for a data handling system, the method comprising an address dispatcher for dispatching read requests to a memory, comprising:
dispatching a first read request;
dispatching a second read request;
dispatching a further first read request;
producing an anomaly signal if a first result produced by the memory in response to the first read request does not agree with a further first result produced by the memory in response to the further first read request,
wherein:
the first read request is dispatched before the second read request is dispatched, and the second read request is dispatched before the further first read request is dispatched wherein the method comprises a first additional step, to be executed after the dispatching of the second read request; the first additional step comprising:
producing the anomaly signal if a second result produced by the memory in response to the second read request does not agree with expectancy data associated with the second read request wherein the method comprises an third additional step, to be executed before the dispatching of the second read request; the third additional step comprising:
configuring the memory in a test mode wherein the memory is arranged to produce a predetermined fixed response to the second read request;
and/or a fourth additional step to be executed after the dispatching of the second read request, the fourth additional step comprising:
reconfiguring the memory in a non-test mode;
wherein
the expectancy data associated with the second read request is equal to the predetermined fixed response to the second read request.

* * * * *